J. C. HARRIS.
TAG FASTENER.
APPLICATION FILED MAY 29, 1909.

949,570.

Patented Feb. 15, 1910.

Witnesses
T. P. Brett
E. C. Duffy

Inventor
John Cooper Harris
By O. C. Duffy
Attorneys

UNITED STATES PATENT OFFICE.

JOHN COOPER HARRIS, OF SAVANNAH, GEORGIA.

TAG-FASTENER.

949,570.

Specification of Letters Patent.   Patented Feb. 15, 1910.

Application filed May 29, 1909. Serial No. 499,242.

*To all whom it may concern:*

Be it known that I, JOHN COOPER HARRIS, a citizen of the United States, residing at Savannah, in the county of Chatham and State of Georgia, have invented certain new and useful Improvements in Tag-Fasteners, and do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to a device for securing tags to bales of cotton; and my invention has for its object to provide a simple and efficient securing means adapted to be driven into a cotton bale and constructed and arranged in such manner that it cannot be removed from the bale.

With this object in view my invention consists in the novel construction of the securing device as will be hereinafter fully described and afterward specifically pointed out in the appended claims.

Figure 1:
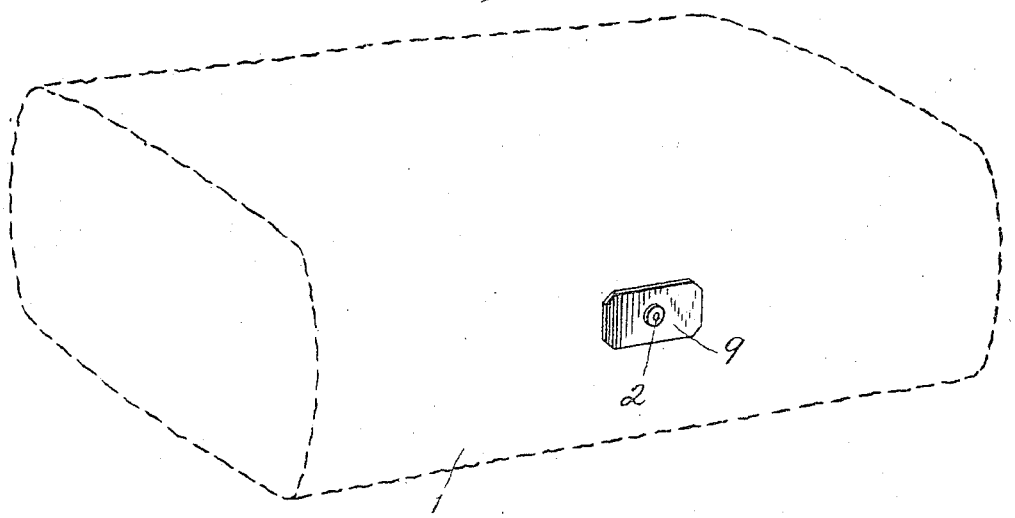
Figure 2:
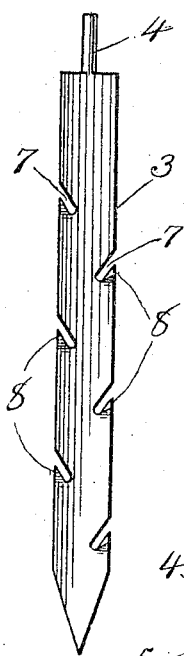
Figure 3:
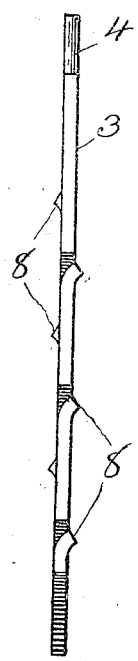
Figure 4:
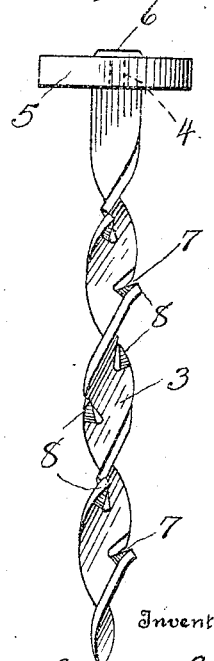
Figure 5:
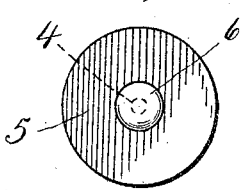

Referring to the accompanying drawing: Figure 1 illustrates a cotton bale having my tag fastening means in position thereon. Fig. 2 is a plan view of a blank of the fastening means. Fig. 3 is an edge view of the same. Fig. 4 is an elevation of the finished fastening means, and Fig. 5 is a top plan view thereof.

Like numerals of reference indicate the same parts throughout the several figures in which;

1 indicates a cotton bale and 2 the tag fastening means, said tag fastening means comprising the spiral shank 3, said spiral shank 3 having a reduced end 4 upon which a head 5 is loosely mounted so as to be rotatable on the reduced end 4, the said end 4 being peened or flattened to form a head 6 in order to secure the head 5 on the shank 3.

As will appear from Fig. 2 the shank 3 is stamped out of a piece of flat strap metal, the edges of the metal being provided with a series of oblique cuts 7 which form a series of sharp barbs or tangs 8, said barbs or tangs 8 having their sharp points bent out of line with the body of the shank as shown in Fig. 3. When the shank is in the form shown in Figs. 2 and 3 the same is then twisted in order to form a spiral as shown in Fig. 4 and the head is applied thereto.

As will appear from Fig. 4 the tangs or barbs 8 are bent out of line with the regular pitch of the spiral for a purpose which will be now fully described.

Having thus fully described the several parts of my invention its operation is as follows: In order to apply a tag such as is illustrated at 9 (Fig. 1) the shank 3 is passed through the tag and driven into the bale in such manner that the said shank passes between the fiber of the cotton, and by reason of the spiral form of the shank the same rotates as it is passing into the bale. When the device is in position on the bale and has been driven in the same cannot be removed for the reason that the head 5 being rotatable on the shank 3 no means is provided by which the device can be rotated or unthreaded out of the bale. Just as soon as any strain is put upon the device for the purpose of removing the same the tangs or barbs 8 being slightly out of the regular pitch of the spiral said tangs or barbs engage the fiber of the cotton to one side of the shank and out of the regular path of the shank 3 so that it is practically impossible to remove the shank after it has been driven in the bale. By reason of the spiral form of the shank the barbs or tangs 8 engage the fiber of the cotton on the outside of the regular path of the shank in a manner which could not be effected were the shank formed straight or round; consequently the holding effect of the shank is increased to a very great extent.

Having thus fully described my invention what I claim as new and desire to secure by Letters Patent of the United States is,—

1. A device of the character described comprising a spiral shank, a head rotatable on said shank, the edges of said shank being provided with a series of sharp tangs or barbs, the points of which are directed toward the head of the shank.

2. A device of the character described comprising a spiral shank, a head rotatable thereon, the edges of the spiral shank being provided with a series of sharp tangs or barbs, the points of said tangs or barbs being bent out of the regular pitch of the spiral and directed toward the head of the shank.

In testimony whereof, I affix my signature, in presence of two witnesses.

JOHN COOPER HARRIS.

Witnesses:
F. A. MILLIGAN,
C. HUGH DUFFY.